(12) United States Patent
Kim et al.

(10) Patent No.: US 12,438,154 B2
(45) Date of Patent: Oct. 7, 2025

(54) POSITIVE ELECTRODE ACTIVE MATERIAL FOR SECONDARY BATTERY, METHOD FOR PREPARING SAME, AND LITHIUM SECONDARY BATTERY INCLUDING THE SAME

(71) Applicant: LG Chem, Ltd., Seoul (KR)

(72) Inventors: Won Tae Kim, Daejeon (KR); Jong Yeol Yu, Daejeon (KR); Hong Kyu Park, Daejeon (KR); Sun Sik Shin, Daejeon (KR); Seong Hoon Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 104 days.

(21) Appl. No.: 18/377,439

(22) Filed: Oct. 6, 2023

(65) Prior Publication Data

US 2024/0038987 A1      Feb. 1, 2024

Related U.S. Application Data

(62) Division of application No. 16/959,033, filed as application No. PCT/KR2019/002165 on Feb. 21, 2019, now Pat. No. 11,831,014.

(51) Int. Cl.
*H01M 4/525*      (2010.01)
*H01M 4/04*      (2006.01)
(Continued)

(52) U.S. Cl.
CPC ......... *H01M 4/525* (2013.01); *H01M 4/0471* (2013.01); *H01M 4/131* (2013.01);
(Continued)

(58) Field of Classification Search
CPC .... H01M 4/525; H01M 4/0471; H01M 4/131; H01M 4/366; H01M 4/505;
(Continued)

(56) References Cited

U.S. PATENT DOCUMENTS

2002/0192148 A1    12/2002   Kweon et al.
2014/0205898 A1    7/2014   Lee et al.
(Continued)

FOREIGN PATENT DOCUMENTS

CN      102983322 A     3/2013
CN      103794782 A     5/2014
(Continued)

OTHER PUBLICATIONS

International Search Report for Application No. PCT/KR2019/002165 mailed Jun. 11, 2019, 2 pages.
(Continued)

*Primary Examiner* — Michael L Dignan
(74) *Attorney, Agent, or Firm* — Lerner David LLP (57) ABSTRACT

A positive electrode active material for a secondary battery including: a lithium complex transition metal oxide which contains nickel (Ni) and cobalt (Co), and contains at least one selected from the group consisting of manganese (Mn) and aluminum (Al); and a composite coating portion which is formed on a surface of the lithium complex transition metal oxide is provided. The lithium complex transition metal oxide has a nickel (Ni) content of 65 mol % or more with respect to the total transition metal content, and the composite coating portion contains cobalt (Co) and boron (B), and contains at least one selected from the group consisting of lanthanum (La), titanium (Ti), and aluminum (Al).

8 Claims, 3 Drawing Sheets

(51) Int. Cl.
*H01M 4/131* (2010.01)
*H01M 4/36* (2006.01)
*H01M 4/505* (2010.01)
*H01M 10/0525* (2010.01)
*H01M 4/02* (2006.01)

(52) U.S. Cl.
CPC .......... *H01M 4/366* (2013.01); *H01M 4/505* (2013.01); *H01M 10/0525* (2013.01); *H01M 2004/028* (2013.01)

(58) Field of Classification Search
CPC ....... H01M 10/0525; H01M 2004/028; H01M 4/36; H01M 4/62; H01M 10/052; H01M 4/485; C01P 2004/84; C01P 2004/80; C01G 53/50; C01G 53/44; Y02E 60/10
See application file for complete search history.

(56) References Cited

U.S. PATENT DOCUMENTS

| | | | |
|---|---|---|---|
| 2015/0093638 A1 | 4/2015 | Shiozaki | |
| 2016/0013476 A1* | 1/2016 | Oh | H01M 4/1391 |
| | | | 427/126.3 |
| 2016/0149210 A1* | 5/2016 | Yoo | H01M 4/525 |
| | | | 429/231.95 |
| 2016/0276659 A1* | 9/2016 | Choi | H01M 4/136 |
| 2017/0263920 A1 | 9/2017 | Choi et al. | |
| 2017/0331092 A1 | 11/2017 | Chen et al. | |
| 2018/0090753 A1* | 3/2018 | Li | H01M 4/0471 |
| 2018/0205084 A1* | 7/2018 | Ham | H01M 4/366 |
| 2018/0241073 A1* | 8/2018 | You | H01M 4/1393 |
| 2018/0261832 A1* | 9/2018 | Nho | H01M 4/628 |
| 2018/0351169 A1 | 12/2018 | Oh et al. | |
| 2019/0020026 A1 | 1/2019 | Choi et al. | |

FOREIGN PATENT DOCUMENTS

| | | | |
|---|---|---|---|
| CN | 104781960 | A | 7/2015 |
| EP | 3316357 | A1 | 5/2018 |
| EP | 3712989 | A1 | 9/2020 |
| EP | 3715333 | A1 | 9/2020 |
| JP | 3582161 | B2 | 10/2004 |
| KR | 20020092736 | A | 12/2002 |
| KR | 20110063335 | A | 6/2011 |
| KR | 20150042610 | A | 4/2015 |
| KR | 20150050458 | A | 5/2015 |
| KR | 20150063955 | A | 6/2015 |
| KR | 20150110318 | A | 10/2015 |
| KR | 20160045029 | A | 4/2016 |
| KR | 101747140 | B1 | 6/2017 |
| KR | 20170076088 | A | 7/2017 |
| KR | 20170081950 | A | 7/2017 |
| KR | 20170103662 | A | 9/2017 |
| KR | 101785266 | B1 | 11/2017 |
| WO | 2015083901 | A1 | 6/2015 |
| WO | 2017069410 | A1 | 4/2017 |

OTHER PUBLICATIONS

Extended European Search Report including Written Opinion for Application No. 19757077.3 dated Feb. 22, 2021, 8 pages.
Chen et al. "The effect of gradient boracic polyanion-doping on structure, morphology, and cycling performance of Ni-rich LiNi0.8Co0.15Al0.0502 cathode material." Journal of Power Sources 374 (2018) 1-11, available online Nov. 2017 (Year: 2017).

* cited by examiner

POSITIVE ELECTRODE ACTIVE MATERIAL FOR SECONDARY BATTERY, METHOD FOR PREPARING SAME, AND LITHIUM SECONDARY BATTERY INCLUDING THE SAME

CROSS-REFERENCE TO RELATED APPLICATIONS

The present application is a divisional application of U.S. application Ser. No. 16/959,033, filed on Jun. 29, 2020, which is a national stage entry under 35 U.S.C. § 371 of International Application No. PCT/KR2019/002165 filed on Feb. 21, 2019, which claims priority to Korean Patent Application No. 10-2018-0022084, filed on Feb. 23, 2018, in the Korean Intellectual Property Office, the disclosures of which are incorporated herein in their entirety by reference.

TECHNICAL FIELD

The present invention relates to a positive electrode active material for a secondary battery, a method for preparing the same, and a lithium secondary battery including the same.

BACKGROUND ART

In recent years, with the rapid spread of electronic devices using batteries, such as mobile phones, notebook computers, and electric vehicles, demands for secondary batteries, which are small in size, light in weight and relatively high in capacity, have been rapidly increased. Particularly, a lithium secondary battery is light in weight and has high energy density, so that it has attracted attention as a driving power source for portable devices. Accordingly, research and development efforts for improving the performance of the lithium secondary battery have been actively conducted.

In the lithium secondary battery in which an organic electrolyte solution or a polymer electrolyte solution is filled between a positive electrode and a negative electrode, which are respectively composed of active materials capable of intercalating and deintercalating lithium ions, electric energy is produced by oxidation and reduction reactions when the lithium ions are intercalated/deintercalated into/from the positive and negative electrodes.

A lithium cobalt oxide ($LiCoO_2$), a lithium nickel oxide ($LiNiO_2$), a lithium manganese oxide ($LiMnO_2$, $LiMn_2O_4$, etc.), a lithium iron phosphate compound ($LiFePO_4$), or the like has been used as a positive electrode active material for a lithium secondary battery. In addition, as a method for improving low thermal stability while maintaining an excellent reversible capacity of the $LiNiO_2$, a lithium complex metal oxide, in which a portion of nickel (Ni) is substituted with cobalt (Co) and manganese (Mn)/aluminum (Al) (hereinafter, simply referred to as 'NCM-based lithium complex transition metal oxide' or 'NCA-based lithium complex transition metal oxide'), has been developed. However, the conventionally developed NCM-based/NCA-based lithium complex transition metal oxide have a limitation to application because of insufficient capacity characteristics.

In order to improve such a limitation, studies for increasing a content of Ni in the NCM-based/NCA-based lithium complex transition metal oxide have been recently conducted. However, in the case of a high-concentration nickel positive electrode active material having a high nickel content, there are problems in that structural stability and chemical stability of the positive electrode active material are deteriorated, and thermal stability is rapidly deteriorated.

In order to ensure the thermal stability of the Ni-rich high-Ni NCM-based/NCA-based lithium transition metal oxide, many studies have been conducted in combination with doping and coating techniques, and the most representative examples of Al coating materials are $Al_2O_3$, $AlF_3$, etc. However, there are problems of capacity decrease and resistance increase in room temperature output when Al is used as a coating material.

Accordingly, it is still necessary to develop a coating material capable of suppressing deterioration of battery performance such as capacity decrease and output decrease while improving thermal stability in the high-Ni NCM-based/NCA-based lithium complex transition metal oxide.

DISCLOSURE OF THE INVENTION

Technical Problem

An aspect of the present invention provides a positive electrode active material for a secondary battery capable of suppressing resistance increase and output decrease depending on a coating material while remarkably improving thermal stability in a high-Ni NCM-based/NCA-based positive electrode active material which contains nickel (Ni) in an amount of 65 mol % or more for ensuring a high capacity. The present invention particularly provides a positive electrode active material for a secondary battery which has excellent thermal stability and excellent electrochemical characteristics even at a high voltage of 4.3 V or higher.

Technical Solution

According to an aspect of the present invention, there is provided a positive electrode active material for a secondary battery, the positive electrode active material including: a lithium complex transition metal oxide which includes nickel (Ni) and cobalt (Co), and includes at least one selected from the group consisting of manganese (Mn) and aluminum (Al); and a composite coating portion which is formed on a surface of the lithium complex transition metal oxide, wherein the lithium complex transition metal oxide has a nickel (Ni) content of 65 mol % or more with respect to the total transition metal content, and the composite coating portion includes cobalt (Co) and boron (B), and contains at least one selected from the group consisting of lanthanum (La), titanium (Ti), and aluminum (Al).

According to another aspect of the present invention, there is provided a method for preparing a positive electrode active material for a secondary battery, the method including: providing a lithium complex transition metal oxide which includes nickel (Ni) and cobalt (Co), and includes at least one selected from the group consisting of manganese (Mn) and aluminum (Al), and has a nickel (Ni) content of 65 mol % or more with respect to the total transition metal content; and forming a composite coating portion on a surface of the lithium complex transition metal oxide by dry mixing and heat treating the lithium complex transition metal oxide, a cobalt (Co) coating source, a boron (B) coating source, and a coating source including at least one selected from the group consisting of lanthanum (La), titanium (Ti), and aluminum (Al).

According to another aspect of the present invention, there are provided a positive electrode and a lithium secondary battery each including the positive electrode active material.

Advantageous Effects

A positive electrode active material for a secondary battery according to the present invention is a high-Ni NCM-based/NCA-based positive electrode active material containing 65 mol % or more of nickel (Ni), with which a high capacity may be ensured and a problem of deterioration of structural and chemical stability caused by an increase in nickel (Ni) content in the high-Ni NCM-based/NCA-based oxide may be improved. Accordingly, excellent thermal stability may be ensured, and resistance increase and output decrease depending on a coating material may also be suppressed. Particularly, excellent thermal stability and excellent electrochemical characteristics may be achieved even at a high voltage of 4.3 V or higher.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

Positive Electrode Active Material

A positive electrode active material for a secondary battery of the present invention includes: a lithium complex transition metal oxide which contains nickel (Ni) and cobalt (Co), and contains at least one selected from the group consisting of manganese (Mn) and aluminum (Al); and a composite coating portion which is formed on a surface of the lithium complex transition metal oxide.

The lithium complex transition metal oxide is a high-nickel (Ni) NCM-based/NCA-based oxide having a nickel (Ni) content of 65 mol % or more with respect to the total transition metal content. More preferably, a content of nickel (Ni) with respect to the total transition metal may be 80 mol % or more. The content of nickel (Ni) with respect to the total transition metal in the lithium complex transition metal oxide satisfies 65 mol % or more, whereby a high capacity may be ensured.

More specifically, the lithium complex transition metal oxide may be represented by Formula 1 below:

[Formula 1]

$$Li_pNi_{1-(x1+y1+z1)}Co_{x1}M^a_{y1}M^b_{z1}M^c_{q1}O_2$$ [Formula 1]

In the formula above, $M^a$ is at least one selected from the group consisting of Mn and Al, $M^b$ is at least one selected from the group consisting of Zr, W, Mg, Al, Ce, Hf, Ta, La, Ti, Sr, Ba, Nb, Mo, and Cr, $M^c$ is at least one selected from the group consisting of Al, Zr, Ti, Mg, Ta, Nb, Mo, and Cr, $0.9 \le p \le 1.5$, $0 < x1 \le 0.2$, $0 < y1 \le 0.2$, $0 \le z1 \le 0.1$, $0 \le q1 < 0.1$, and $0 < x1+y1+z1 \le 0.35$.

In the lithium complex transition metal oxide of Formula 1, Li may be contained in an amount corresponding to p, that is, in an amount of $0.9 \le p \le 1.5$. When p is less than 0.9, there is a possibility that the capacity is deteriorated, and when p exceeds 1.5, particles are sintered in a firing process, whereby preparation of a positive electrode active material may be difficult. Considering the remarkable improvement effect of the capacity characteristics of the positive electrode active material according to the Li content control and the balance of the sintering property in preparation of the active material, Li may be more preferably contained in an amount of $1.0 \le P \le 1.15$.

In the lithium complex transition metal oxide of Formula 1, Ni may be contained in an amount corresponding to $1-(x1+y1+z1)$, for example, in an amount of $0.65 \le 1-(x1+y1+z1) < 1$. When the content of Ni in the lithium complex transition metal oxide of Formula 1 is 0.65 or more, a sufficient amount of Ni, which may contribute to charge and discharge, is ensured, thereby achieving the high capacity. More preferably, Ni may be contained in an amount of $0.80 \le 1-(x1+y1+z1) \le 0.99$.

In the lithium complex transition metal oxide of Formula 1, Co may be contained in an amount corresponding to x1, that is, in an amount of $0 < x1 \le 0.2$. When the content of Co in the lithium complex transition metal oxide of Formula 1 exceeds 0.2, there is a possibility of cost increase. Considering the remarkable improvement effect of the capacity characteristics according to the inclusion of Co, Co may be more specifically contained in an amount of $0.05 \le x1 \le 0.2$.

In the lithium complex transition metal oxide of Formula 1, $M^a$ may be Mn or Al, or may be Mn and Al, and such a metal element may improve the stability of the active material, and as a result, improve the stability of the battery. Considering the improvement effect of the life-time characteristics, $M^a$ may be contained in an amount corresponding to y1, that is, in an amount of $0 < y1 \le 0.2$. When y1 in the lithium complex transition metal oxide of Formula 1 exceeds 0.2, the output characteristics and capacity characteristics of the battery may rather be deteriorated, and $M^a$ may be more specifically contained in an amount of $0.05 \le y1 \le 0.2$.

In the lithium complex transition metal oxide of Formula 1, M b may be a doping element contained in a crystal structure of the lithium complex transition metal oxide, and $M^b$ may be contained in an amount corresponding to z1, that is, in an amount of $0 \le z1 \le 0.1$.

In the lithium complex transition metal oxide of Formula 1, metal element $M^c$ may not be contained in the structure of the lithium composite transition metal oxide, and the lithium complex transition metal oxide doped with $M^c$ on a surface thereof may be prepared through a method in which when precursor and lithium source are mixed and fired, the $M^c$ source may also be mixed and fired together, or after forming the lithium complex transition metal oxide, the $M^c$ source may be separately added and fired. $M^c$ may be contained in an amount corresponding to q1, that is, may be contained in an amount not deteriorating the positive electrode active material characteristics within a range of $0 \le q1 \le 0.1$.

The positive electrode active material of the present invention includes a composite coating portion which is formed on a surface of the lithium complex transition metal oxide. The composite coating portion includes cobalt (Co) and boron (B), and includes at least one selected from the group consisting of lanthanum (La), titanium (Ti), and aluminum (Al).

In the present invention, since the above-described composite coating portion is formed on a high-nickel (Ni) NCM-based/NCA-based oxide having 65 mol % or more of nickel (Ni), deterioration of the structural/chemical stability may be improved and the excellent thermal stability may be ensured.

The composite coating portion may contain, for example, cobalt (Co)-lanthanum (La)-boron (B), cobalt (Co)-titanium (Ti)-boron (B), or cobalt (Co)-aluminum (Al)-boron (B). That is, the composite coating portion may contain at least three kinds of coating materials.

The cobalt (Co) contained in the composite coating portion may be contained in an amount of 1,000-8,000 ppm, more preferably 2,000-7,000 ppm, and far more preferably 3,000-5,000 ppm, with respect to the total weight of the positive electrode active material.

The boron (B) contained in the composite coating portion may be contained in an amount of 50-700 ppm, more preferably 100-600 ppm, and far more preferably 200-400 ppm, with respect to the total weight of the positive electrode active material.

At least one selected from the group consisting of lanthanum (La), titanium (Ti), and aluminum (Al) contained in the composite coating portion may be contained in an amount of 1,000-8,000 ppm, more preferably 2,000-7,000 ppm, and far more preferably 3,000-5,000 ppm, with respect to the total weight of the positive electrode active material.

Even though it is a high-nickel (Ni) NCM-based/NCA-based oxide having 65 mol % or more of nickel (Ni), excellent thermal stability may be ensured and there may be effects of reducing room temperature resistance and reducing gas generation because the cobalt (Co), boron (B), and at least one selected from the group consisting of lanthanum (La), titanium (Ti), and aluminum (Al) are applied with the content satisfying the above range.

The composite coating portion may be included in an amount of 1.0-2.5 parts by weight, more preferably 1.4-1.9 parts by weight, with respect to 100 parts by weight of the lithium complex transition metal oxide.

The composite coating portion may have a thickness of 100-300 nm, more preferably 120-200 nm.

The positive electrode active material of the present invention including the above-described composite coating portion may exhibit a main peak having a maximum heat flow at 280° C. or higher during thermal analysis by differential scanning calorimetry (DSC), and more preferably a main peak may exhibit at 285-295° C. In addition, a maximum heat flow at the main peak may be 1,500 W/g or less, more preferably 1,400 W/g or less.

Method for Preparing Positive Electrode Active Material

A positive electrode active material of the present invention is prepared by including: providing a lithium complex transition metal oxide which contains nickel (Ni) and cobalt (Co), and contains at least one selected from the group consisting of manganese (Mn) and aluminum (Al), and has a nickel (Ni) content of 65 mol % or more with respect to the total transition metal content; and forming a composite coating portion on a surface of the lithium complex transition metal oxide by dry mixing and heat treating the lithium complex transition metal oxide, a cobalt (Co) coating source, a boron (B) coating source, and a coating source including at least one selected from the group consisting of lanthanum (La), titanium (Ti), and aluminum (Al).

The cobalt (Co) coating source may contain at least one selected from the group consisting of $Co(OH)_2$, $Co_2O_3$, $Co_3(PO_4)_2$, $CoF_3$, $CoOOH$, $Co(OCOCH_3)_2 \cdot 4H_2O$, $Co(NO_3) \cdot 6H_2O$, $Co_3O_4$, $Co(SO_4)_2 \cdot 7H_2O$, and $CoC_2O_4$, and may more preferably be $Co(OH)_2$ or $Co_3O_4$.

The boron (B) coating source may contain at least one selected from the group consisting of $B_4C$, $B_2O_3$, $BF_3$, $H_3BO_3$, $(C_3H_7O)_3B$, $(C_6H_5O)_3B$, $[CH_3(CH_2)_3O]_3B$, $C_{13}H_{19}O_3$, $C_6H_5B(OH)_2$, and $B_2F_4$, and may more preferably be $B_4C$. $B_4C$ has a relatively high melting point, and may be advantageously applied as a coating source when a high temperature heat treatment is performed. In addition, Co may be easily oxidized due to a strong reduction action of C contained in $B_4C$, and at the same time, C may easily inhibit oxidation of the coating source, thereby being more preferable for forming a composite coating portion.

The coating source containing at least one selected from the group consisting of lanthanum (La), titanium (Ti), and aluminum (Al) may contain at least one selected from the group consisting of $La_2O_3$, $LaN_3O_9$, $H_{12}LaN_3O_{15}$, $LaCl_3$, $LaB_6$, $La(CH_3CO_2)_3 \cdot xH_2O$, $La(OH)_3$, $LaC_2$, $C_3H_{16}La_2O_{17}$, $LaAlO_3$, $TiO_2$, $Ti(OBu)_4$, $TiB_2$, $TiC$, $TiF_3$, $Ti(NO_3)_4$, $TiCl_2$, $Ti_4P_3$, $Al_2O_3$, $Al(NO_3)_3$, $Al(OH)_3$, $AlPO_4$, $Al_2(SO_4)_3$, $Al_2O$, $AlF_3$, $Al_4C_3$, and $C_6H_{15}AlO_3$, and may more preferably use $La_2O_3$, $TiO_2$, or $Al_2O_3$.

The coating sources are not particularly limited to those described above, but the coating source according to an embodiment of the present invention may not contain lithium (Li). In the case of a high-nickel (Ni) NCM-based/NCA-based oxide having 65 mol % or more of nickel (Ni), a content of the lithium by-products remaining on the surface is increased due to increase of nickel, and the present invention has an effect of reducing the content of the residual lithium by-products since a coating source which does not contain lithium (Li) is used, and the coating source and the residual lithium by-products react with each other during a heat treatment process.

The cobalt (Co) coating source may be mixed in an amount of 0.5-1.5 parts by weight, more preferably 0.8-1.0 part by weight, with respect to 100 parts by weight of the lithium complex transition metal oxide.

The boron (B) coating source may be mixed in an amount of 0.01-0.06 parts by weight, more preferably 0.02-0.04 parts by weight, with respect to 100 parts by weight of the lithium complex transition metal oxide.

The coating source containing at least one selected from the group consisting of lanthanum (La), titanium (Ti), and aluminum (Al) may be mixed in an amount of 0.4-1.5 parts by weight, more preferably 0.6-1.0 parts by weight, with respect to 100 parts by weight of the lithium complex transition metal oxide.

When each mixed part by weight in the coating source, which contains the cobalt (Co) coating source, the boron (B) coating source, and at least one selected from the group consisting of lanthanum (La), titanium (Ti), and aluminum (Al), satisfies the above-describe range, excellent thermal stability may be ensured and there may be effects of reducing room temperature resistance and reducing gas generation even though it is a high-nickel (Ni) NCM-based/NCA-based oxide having 65 mol % or more of nickel (Ni).

The coating sources may be dry mixed with a lithium complex transition metal oxide, and then heat-treated at 500-750° C. to form the composite coating portion. The heat treating may be more preferably performed at 600-700° C.

When the heat treatment temperature for forming the composite coating portion is less than 500° C., unreacted cobalt (Co) by-products may be formed, and when exceeding 750° C., there may be a problem of increasing lithium (Li) by-products due to boron (B).

Positive Electrode and Secondary Battery

According to another embodiment of the present invention, there is provided a positive electrode for a lithium secondary battery and a lithium secondary battery including the positive electrode active material.

Specifically, the positive electrode includes a positive electrode current collector and a positive electrode active material layer which is formed on the positive electrode current collector and contains the positive electrode active material.

In the positive electrode, the positive electrode current collector is not particularly limited as long as having conductivity without causing any chemical changes in a battery, and for example, stainless steel, aluminum, nickel, titanium, sintered carbon, or aluminum or stainless steel of which a surface is surface-treated with carbon, nickel, titanium, silver, etc. may be used. In addition, the positive electrode current collector may conventionally have a thickness of 3-500 µm, and fine unevenness may be formed on a surface of the positive electrode current collector to enhance adhesion of the positive electrode active material. Various forms such as film, sheet, foil, net, porous body, foam, and nonwoven fabric may be used.

Furthermore, the positive electrode active material layer may include a conductive material and a binder in addition to the above-described positive electrode active material.

The conductive material is used for imparting conductivity to an electrode, and may be used without particular limitation as long as having electronic conductivity without causing any chemical changes in the constituted battery. Specific examples thereof may include graphite (e.g., natural graphite or synthetic graphite); a carbon-based material (e.g., carbon black, acetylene black, Ketjen black, channel black, furnace black, lamp black, thermal black, or carbon fiber); a metal powder or metal fiber (e.g., copper, nickel, aluminum, or silver); conductive whisker (e.g., zinc oxide or potassium titanate); a conductive metal oxide (e.g., titanium oxide); or a conductive polymer (e.g., polyphenylene derivatives), and any one alone or a mixture of two or more thereof may be used. The conductive material may be conventionally contained in an amount of 1-30 wt % with respect to the total weight of the positive electrode active material layer.

In addition, the binder serves to improve adhesion between the positive electrode active material particles and adhesion between the positive electrode active material and positive electrode current collector. Specific examples thereof may include polyvinylidene fluoride (PVDF), vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, ethylene-propylene-diene monomer(EPDM), sulfonated-EPDM, styrene butadiene rubber (SBR), fluorine rubber, or various copolymers thereof, and any one alone or a mixture of two or more thereof may be used. The binder may be contained in an amount of 1-30 wt % with respect to the total weight of the positive electrode active material layer.

The positive electrode may be produced according to the typical positive electrode producing method, except that the positive electrode uses the above-described positive electrode active material. Specifically, the positive electrode may be produced through which a composition for forming a positive electrode active material layer which includes the above-described positive electrode active material, and optionally, a binder and a conductive material, is applied on the positive electrode current collector, and then dried and rolled. Here, the types and contents of the positive electrode active material, binder, and conductive material are the same as those described above.

Solvents generally used in the art may be used as the solvent, and examples thereof may include dimethyl sulfoxide (DMSO), isopropyl alcohol, N-methylpyrrolidone (NMP), acetone, water, etc., and any one alone or a mixture of two or more thereof may be used. An amount of the solvent to be used is sufficient to dissolve or disperse the positive electrode active material, conductive material, and binder in consideration of the applying thickness of a slurry and manufacturing yield, and to have a viscosity capable of exhibiting excellent thickness uniformity when afterward applied for producing the positive electrode.

Alternatively, the positive electrode may be produced by casting the composition for forming a positive electrode active material layer on a separate support, and then laminating a film, which is obtained by peeling off the support, on the positive electrode current collector.

According to another embodiment of the present invention, there is provided an electrochemical device including the positive electrode. The electrochemical device may specifically be a battery, a capacitor, etc., and more specifically, may be a lithium secondary battery.

The lithium secondary battery specifically includes: a positive electrode; a negative electrode disposed to face the positive electrode; a separator disposed between the positive electrode and negative electrode; and an electrolyte, and the positive electrode is the same as that described above. In addition, the lithium secondary battery may optionally further include: a battery container for storing an electrode assembly of the positive electrode, negative electrode, and separator; and a sealing member for sealing the battery container.

In the lithium secondary battery, the negative electrode includes a negative electrode current collector and a negative electrode active material layer disposed on the negative electrode current collector.

The negative electrode current collector is not particularly limited as long as having high conductivity without causing any chemical changes in a battery, and for example, copper, stainless steel, aluminum, nickel, titanium, sintered carbon, copper or stainless steel of which a surface is surface-treated with carbon, nickel, titanium, silver, etc., or an aluminum-cadmium alloy may be used. In addition, the negative electrode current collector may conventionally have a thickness of 3-500 µm, and similarly to the positive electrode collector, fine unevenness may be formed on a surface of the current collector to enhance adhesion of the negative electrode active material. Various forms such as film, sheet, foil, net, porous body, foam, and nonwoven fabric may be used.

The negative electrode active material layer optionally includes a binder and a conductive material in addition to the negative electrode active material. As an embodiment, the negative electrode active material layer may be prepared by applying and drying a composition for forming a negative electrode which includes a negative electrode active material, and optionally a binder and a conductive material, on a negative electrode current collector, or alternatively, by casting the composition for forming a negative electrode on a separate support, and then laminating a film, which is obtained by peeling off the support, on the negative electrode current collector.

A compound capable of reversible intercalation and deintercalation of lithium may be used as the negative electrode active material. Specific examples thereof may include a carbonaceous material (e.g., artificial graphite, natural graphite, a graphitized carbon fiber, or amorphous carbon); a metallic compound capable of alloying with lithium (e.g., Si, Al, Sn, Pb, Zn, Bi, In, Mg, Ga, Cd, a Si alloy, a Sn alloy, or an Al alloy); a metal oxide capable of doping and un-doping lithium (e.g., $SiO_\alpha (0<\alpha 2)$, $SnO_2$, vanadium oxide, or lithium vanadium oxide); or a composite containing the metallic compound and the carbonaceous material (e.g., a Si—C composite or a Sn—C composite), and any one alone or a mixture of two or more thereof may be used. A metallic lithium thin film may also be used as the negative electrode active material. In addition, both low-crystalline carbon and high-crystalline carbon may be used as the carbon material. As typical examples of the low-crystalline carbon, soft carbon or hard carbon may be used, and as typical examples of the high-crystalline carbon, natural graphite or artificial graphite in a form of being amorphous, planar, scaly, spherical, or fibrous; Kish graphite; pyrolytic carbon; mesophase pitch-based carbon fibers; meso-carbon microbeads; mesophase pitches; or high-temperature sintered carbon such as petroleum or coal tar pitch derived cokes may be used.

Furthermore, the binder and the conductive material may be the same as those in the positive electrode described above.

Meanwhile, in the lithium secondary battery, the separator serves to separate the negative electrode and the positive electrode from each other, and provide a transfer channel of lithium ions, and any separator may be used as the separator without particular limitation as long as conventionally used in a lithium secondary battery. Particularly, a separator having excellent electrolyte-retention ability as well as low resistance to transfer of the electrolyte ions may be preferably used. Specifically, a porous polymer film formed of a polyolefin-based polymer such as ethylene homopolymer, propylene homopolymer, ethylene/butene copolymer, ethylene/hexene copolymer, or ethylene/methacrylate copolymer, or a laminated structure having two or more layers thereof may be used. A conventional porous nonwoven fabric, for example, a nonwoven fabric formed of glass fibers or polyethylene terephthalate fibers, which has a high melting point, may also be used. In addition, a coated separator containing a ceramic component or a polymer material may be used to ensure heat resistance or mechanical strength, and either a single-layer structure or a multi-layer structure may be optionally used.

Furthermore, as examples of the electrolyte used in the present invention, an organic-based liquid electrolyte, an inorganic-based liquid electrolyte, a solid polymer electrolyte, a gel-type polymer electrolyte, a solid inorganic electrolyte, or a molten-type inorganic electrolyte which is available in the manufacture of the lithium secondary battery may be used, but the embodiment is not limited thereto.

Specifically, the electrolyte may include an organic solvent and a lithium-salt.

The organic solvent may be used without particular limitation as long as the organic solvent may serve as a medium through which ions involved in the electrochemical reaction of the battery may be transferred. Specifically, as examples of the organic solvent, an ester-based solvent (e.g., methyl acetate, ethyl acetate, γ-butyrolactone, or ε-caprolactone); an ether-based solvent (e.g., dibutyl ether or tetrahydrofuran); a ketone-based solvent (e.g., cyclohexanone); an aromatic hydrocarbon-based solvent (e.g., benzene or fluorobenzene); a carbonate-based solvent (e.g., dimethylcarbonate (DMC), diethylcarbonate (DEC), methylethylcarbonate (MEC), ethylmethylcarbonate (EMC), ethylene carbonate (EC), or propylene carbonate (PC)); an alcohol-based solvent (e.g., ethyl alcohol or isopropyl alcohol); nitriles (e.g., R—CN where R is a linear, branched, or cyclic hydrocarbon group having C2 to C20, and may contain a double-bond aromatic ring or ether-bond.); amides (e.g., dimethylformamide); dioxolanes (e.g., 1,3-dioxolane); or sulfolanes may be used. Among these examples, the carbonate-based solvent may be preferably used, and a mixture of cyclic carbonate (e.g., ethylene carbonate or propylene carbonate), which has high ionic conductivity and high dielectric constant to increase charge and discharge properties of a battery, and low-viscosity linear carbonate-based compound (e.g., ethylmethylcarbonate, dimethylcarbonate, or diethylcarbonate) may be more preferably used. In this case, when the cyclic carbonate and chain carbonate are mixed at a volume ratio of about 1:1 to 1:9, the electrolyte may exhibit excellent performance.

The lithium-salt may be used without particular limitation as long as a compound capable of providing lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium-salt. The lithium-salt may be preferably used in a concentration range of 0.1-2.0 M. When a concentration of the lithium-salt is included within the above range, the electrolyte has suitable conductivity and viscosity, thereby exhibiting excellent performance of an electrolyte and effectively transferring lithium ions.

In addition to the electrolyte components, to improve life-time characteristics of a battery, inhibit capacity reduction of a battery, and improve discharge capacity of a battery, the electrolyte may further include at least one additive among, for example, halo-alkylene carbonate-based compound (e.g., difluoroethylene carbonate), pyridine, triethylphosphite, triethanolamine, cyclic ether, ethylene diamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium-salt, pyrrole, 2-methoxy ethanol, aluminum trichloride, etc. In this case, the additive may be included in an amount of 0.1-5 wt % with respect to the total weight of the electrolyte.

As described above, since the lithium secondary battery including the positive electrode active material according to the present invention stably exhibits the excellent discharge capacity, output characteristics, and capacity retention rate, the lithium secondary battery is useful in portable devices (e.g., a mobile phone, notebook computer, or digital camera) and electric vehicle industries (e.g., hybrid electric vehicles (HEVs)).

Accordingly, according to another embodiment of the present invention, there are provided a battery module including the lithium secondary battery as a unit cell and a battery pack including the same.

The battery module or the battery pack may be used as a power source of a medium- or large-sized device for at least one of a power tool; electric vehicles including electric vehicle (EV), hybrid electric vehicle, and plug-in hybrid electric vehicle (PHEV); or a power storage system.

Hereinafter, the present invention will be described in more detail according to examples. However, the invention may be embodied in many different forms and should not be construed as being limited to the embodiments set forth herein.

EXAMPLE 1

Lithium carbonate ($Li_2CO_3$) was added to a precursor having a molar ratio of Ni:Co:Mn of 65:20:15 such that a molar ratio of Li/Metal (Ni, Co, Mn) was 1.08, and the mixed powder was added into an alumina crucible for heat treatment. Thereafter, heat treatment was performed in an oxygen atmosphere at 750° C. for 5 hours, and then heat treatment was performed at 870° C. for 10 hours to prepare a lithium complex transition metal oxide which is $Li_{1.08}Ni_{0.65}Co0.20Mn_{0.15}O_2$.

Thereafter, the heat-treated lithium complex transition metal oxide powder was pulverized using a mortar, and 0.9 parts by weight of $Co(OH)_2$, 0.6 parts by weight of $La_2O_3$, and 0.03 parts by weight of $B_4C$ were mixed with respect to 100 parts by weight of the lithium complex transition metal oxide. The mixture was heat treated at 600° C. for 5 hours in an air atmosphere to prepare a positive electrode active material in which a Co—La—B composite coating portion (Co: 5,000 ppm, La: 5,000 ppm, B: 200 ppm) was formed.

EXAMPLE 2

A Co—Ti—B composite coating portion (Co: 5,000 ppm, Ti: 5,000 ppm, B: 200 ppm) was formed in the same manner as in Example 1, except that 0.8 parts by weight of $TiO_2$ was used instead of 0.6 parts by weight of $La_2O_3$ as a coating source.

EXAMPLE 3

A Co—Al—B composite coating portion (Co: 5,000 ppm, Al: 5,000 ppm, B: 200 ppm) was formed in the same manner as in Example 1, except that 1.0 part by weight of $Al_2O_3$ was used instead of 0.6 parts by weight of $La_2O_3$ as a coating source.

Comparative Example 1

0.6 parts by weight of $W_2O_3$ and 0.3 parts by weight of $H_3BO_3$ were mixed with respect to 100 parts by weight of a lithium complex transition metal oxide of $Li_{1.07}Ni_{0.6}Co_{0.2}Mn_{0.2}O_2$. The mixture was heat treated at 400° C. for 4 hours in an air atmosphere to prepare a positive electrode active material.

Comparative Example 2

A positive electrode active material was prepared in the same manner as in Comparative Example 1, except that a lithium complex transition metal oxide of $Li_{1.08}Ni_{0.65}Co_{0.20}Mn_{0.15}O_2$ was used.

Comparative Example 3

0.9 parts by weight of $Co(OH)_2$ and 0.03 parts by weight of $B_4C$ were mixed with respect to 100 parts by weight of a lithium complex transition metal oxide of $Li_{1.08}Ni_{0.65}Co_{0.20}Mn_{0.15}O_2$. The mixture was heat treated at 600° C. for 5 hours in an air atmosphere to prepare a positive electrode active material (Co: 5,000 ppm, B: 200 ppm).

Manufacture Example: Manufacture of Lithium Secondary Battery

The respective positive electrode active material prepared in Examples 1 to 3 and Comparative Examples 1 to 3, carbon black conductive material, and PVdF binder were mixed in a N-methylpyrrolidone solvent at a weight ratio of 96.5:1.5:2 to prepare a positive electrode mixture (viscosity: 5000 mPa·s), and then the mixture was applied on one surface of an aluminum current collector, and thereafter dried at 130° C. and rolled to produce a positive electrode.

Natural graphite as a negative electrode active material, carbon black conductive material, and PVdF binder were mixed in a N-methylpyrrolidone solvent at a weight ratio of 85:10:5 to prepare a composition for forming a negative electrode, and then the mixture was applied on one surface of a copper current collector to prepare a negative electrode.

A porous polyethylene separator was disposed between the positive electrode and negative electrode which had been produced as described above to produce an electrode assembly, and the electrode assembly was disposed inside a case, and then an electrolyte was injected into the case to manufacture a lithium secondary battery. At this time, the electrolyte was prepared by dissolving lithium hexafluorophosphate (LiPF 6) at a concentration of 1.0 M in an organic solvent composed of ethylene carbonate/dimethyl carbonate/ethylmethyl carbonate (mixed volume ratio of EC/DMC/EMC=3/4/3).

Experimental Example 1: Evaluation of Thermal Stability

To evaluate thermal stability of the positive electrode active materials prepared in Examples 1 to 3 and Comparative Examples 1 to 3, a heat flow according to temperature was measured by using a differential scanning calorimeter (SENSYS Evo of SETARAM, Inc.). Specifically, the lithium secondary battery manufactured according to Manufacture Example by using the positive electrode active materials prepared in Examples 1 to 3 and Comparative Examples 1 to 3 was decomposed in a SOC 100% charged state, and the positive electrode and new electrolyte were added into a cell for DSC measurement, and then measurement was performed while raising temperature by 10° C. per minute from room temperature to 400° C. The results are shown in Table 1 and FIG. 1.

TABLE 1

Figure 1:
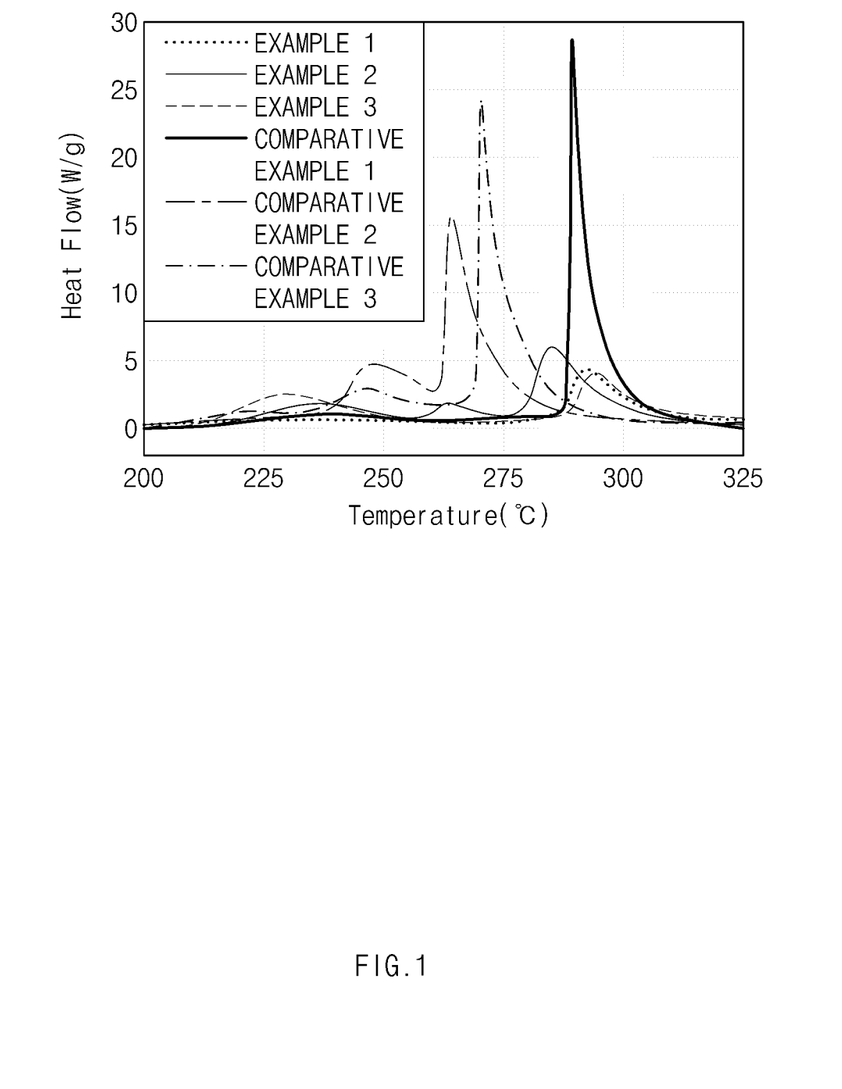
FIG. 1 is a graph showing a result of thermal analysis by differential scanning calorimetry (DSC) on a positive electrode active material prepared according to Examples and Comparative Examples.

|  | DSC main peak (° C.) | Maximum heat flow (W/g) |
| --- | --- | --- |
| Example 1 | 291 | 1,327 |
| Example 2 | 291 | 1,296 |
| Example 3 | 285 | 1,391 |
| Comparative Example 1 | 289 | 1,689 |
| Comparative Example 2 | 262 | 1,442 |
| Comparative Example 3 | 267 | 1,558 |

Referring to Table 1 and FIG. 1, it could be confirmed that Examples 1 to 3, in which the composite coating portions of the present invention were formed, exhibited the main peaks having the maximum heat flow at the relatively high temperature of 280° C. or higher, and the maximum heat flow was remarkably reduced as compared with Comparative Examples 1 to 3. Thereby, it can be seen that the thermal stability was significantly improved in the case of Examples 1 to 3.

Experimental Example 2: Evaluation of Room Temperature Resistance

Resistance of the lithium secondary battery manufactured according to Manufacture Example by using the positive electrode active materials prepared in Examples 1 to 3 and Comparative Examples 1 was measured in a SOC 50% state for discharge 10 seconds at a room temperature (25° C.). The results are shown in FIG. 2.

Figure 2:
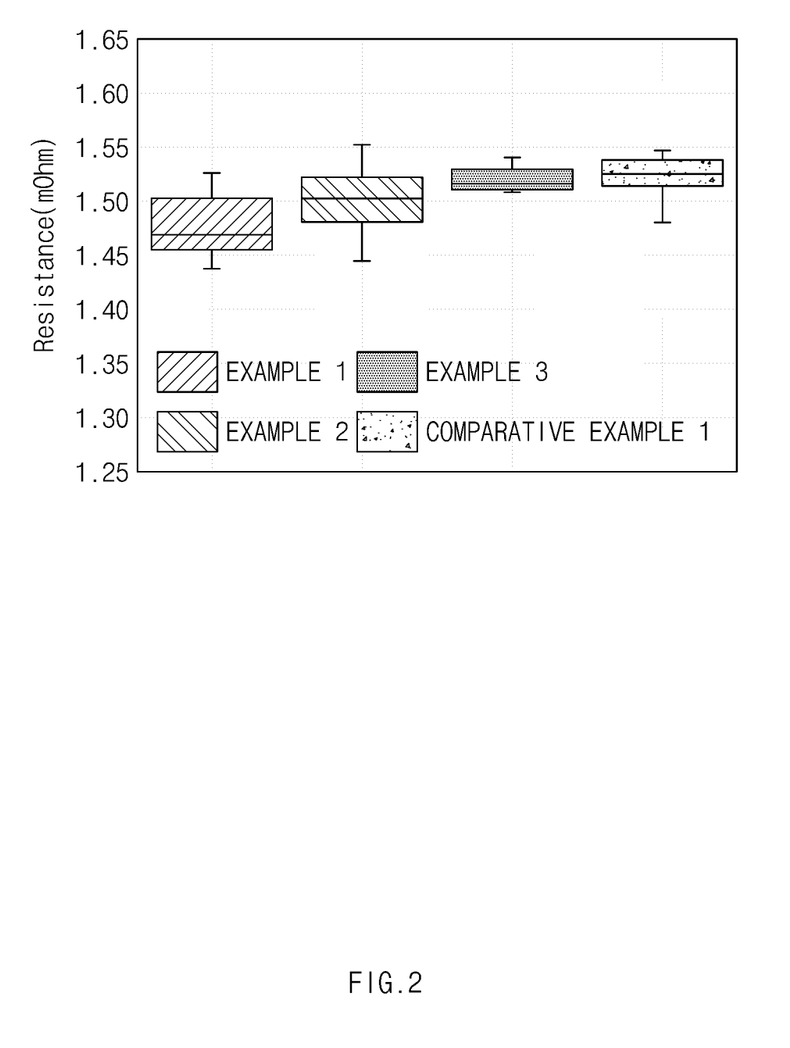
FIG. 2 is a graph showing an evaluation result of room temperature resistance characteristics of a secondary battery manufactured using a positive electrode active material prepared according to Examples and Comparative Examples.

Referring to FIG. 2, in Examples 1 to 3 in which the composite coating portions of the present invention were formed, the room temperature resistance was improved as compared with Comparative Example 1. That is, it could be confirmed that in Examples 1 to 3 in which the composite coating portions of the present invention were formed, the resistance increase was inhibited while remarkably improving the thermal stability as compared with Comparative Example 1.

Experimental Example 3: Evaluation of Low Temperature Output Characteristics Low temperature output was evaluated by a voltage difference generated by discharging the lithium secondary battery manufactured according to Manufacture Example by using the positive electrode active materials prepared in Examples 1 to 3 and Comparative Examples 1 at −25° C. in a SOC 20% to 3 V at 0.6C, and the results are shown in Table 2 below.

TABLE 2

| | Discharge entire section | | |
| --- | --- | --- | --- |
| | ΔVoltage | Resistance (Ω) | Percentage of resistance(%) |
| Example 1 | 0.489 | 31.00 | 100.0 |
| Example 2 | 0.545 | 34.49 | 111.3 |
| Example 3 | 0.535 | 33.57 | 108.3 |
| Comparative Example 1 | 0.574 | 35.50 | 114.5 |

Referring to Table 2, in Examples 1 to 3 in which the composite coating portions of the present invention were formed, the low temperature output was improved as compared with Comparative Example 1. That is, it could be confirmed that in Examples 1 to 3 in which the composite coating portions of the present invention were formed, the low temperature output deterioration was inhibited while remarkably improving the thermal stability as compared with Comparative Example 1.

Experimental Example 4: Evaluation of Gas Generation

Figure 3:
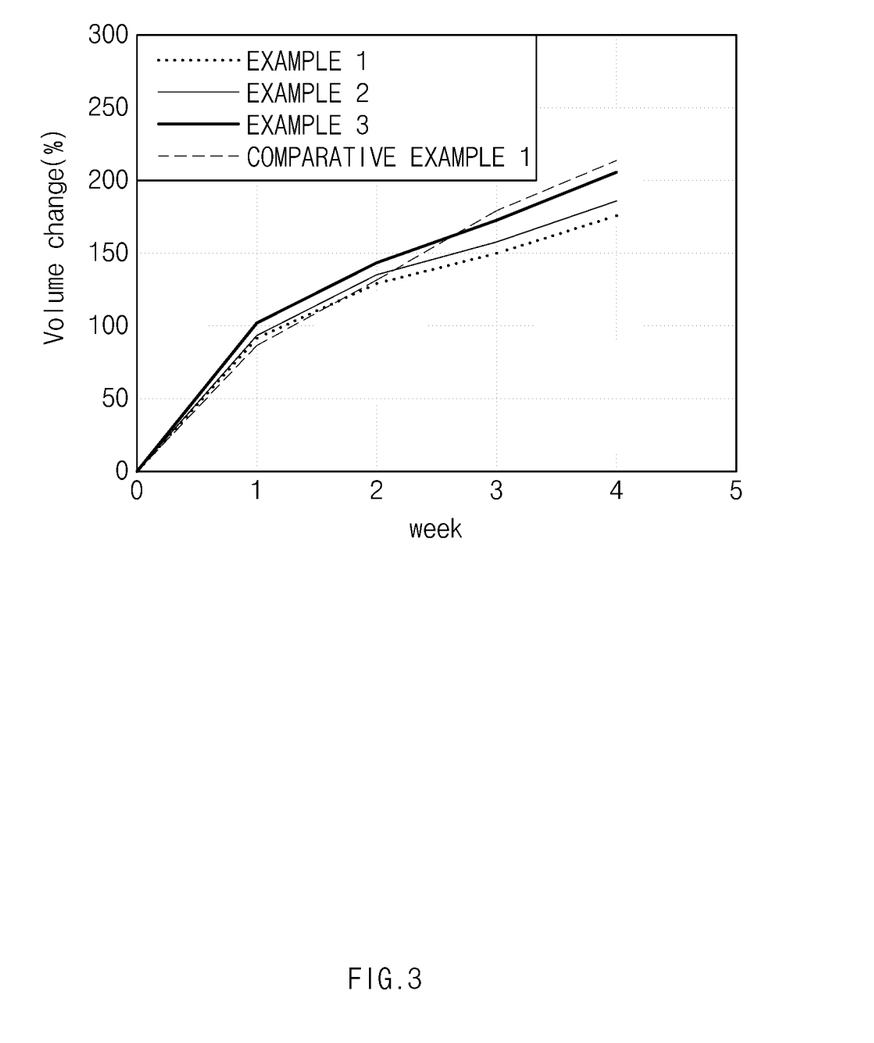
FIG. 3 is a graph showing an evaluation result of a gas generated amount during storage at a high temperature of a secondary battery manufactured using a positive electrode active material prepared according to Examples and Comparative Examples.

An amount of gas generation was measured per week by storing the lithium secondary battery manufactured according to Manufacture Example by using the positive electrode active materials prepared in Examples 1 to 3 and Comparative Examples 1 in a SOC 100% at 90° C. for 4 weeks, and the results are shown in FIG. 3.

Referring to FIG. 3, it could be confirmed that in Examples 1 to 3 in which the composite coating portions of the present invention were formed, the amount of gas generation was decreased after 2 weeks as compared with Comparative Example 1. Particularly, in Examples 1 and 2, the amount of gas generation was remarkably decreased as compared with Comparative Example 1.

The invention claimed is:

1. A method for preparing a positive electrode active material for a secondary battery, comprising:
   providing a lithium complex transition metal oxide which includes nickel (Ni), cobalt (Co), and at least one selected from the group consisting of manganese (Mn) and aluminum (Al), and has a nickel (Ni) content of 65 mol % or more with respect to a total transition metal content; and
   forming a composite coating portion on a surface of the lithium complex transition metal oxide by dry mixing and heat treating the lithium complex transition metal oxide, a cobalt (Co) coating source, a boron (B) coating source, and a coating source including at least one selected from the group consisting of lanthanum (La), titanium (Ti), and aluminum (Al).

2. The method of claim 1,
   wherein the cobalt (Co) coating source comprises $Co(OH)_2$, $Co_2O_3$, $Co_3(PO_4)_2$, $CoF_3$, $CoOOH$, $Co(OCOCH_3)_2 \cdot 4H_2O$, $Co(NO_3) \cdot 6H_2O$, $Co_3O_4$, $Co(SO_4)_2 \cdot 7H_2O$, or $CoC_2O_4$.

3. The method of claim 1,
   wherein the boron (B) coating source comprises $B_4C$, $B_2O_3$, $BF_3$, $H_3BO_3$, $(C_3H_7O)_3B$, $(C_6H_5O)_3B$, $[CH_3(CH_2)_3O]_3B$, $C_6H_5B(OH)_2$, or $B_2F_4$.

4. The method of claim 1,
   wherein the coating source including the at least one selected from the group consisting of lanthanum (La), titanium (Ti), and aluminum (Al) comprises $La_2O_3$, $LaN_3O_9$, $H_{12}LaN_3O_{15}$, $LaCl_3$, $LaB_6$, $La(CH_3CO_2)_3 \cdot xH_2O$, $La(OH)_3$, $LaC_2$, $C_3H_{16}La_2O_{17}$, $LaAlO_3$, $TiO_2$, $Ti(OBu)_4$, $TiB_2$, $TiC$, $TiF_3$, $Ti(NO_3)_4$, $TiCl_2$, $Ti_4P_3$, $Al_2O_3$, $Al(NO_3)_3$, $Al(OH)_3$, $AlPO_4$, $Al_2(SO_4)_3$, $Al_2O$, $AlF_3$, $Al_4C_3$, or $C_6H_{15}AlO_3$.

5. The method of claim 1,
   wherein the cobalt (Co) coating source is mixed in an amount of 0.5-1.5 parts by weight with respect to 100 parts by weight of the lithium complex transition metal oxide.

6. The method of claim 1,
   wherein the boron (B) coating source is mixed in an amount of 0.01-0.06 parts by weight with respect to 100 parts by weight of the lithium complex transition metal oxide.

7. The method of claim 1,
   wherein the coating source including the at least one selected from the group consisting of lanthanum (La), titanium (Ti), and aluminum (Al) is mixed in an amount of parts by weight with respect to 100 parts by weight of the lithium complex transition metal oxide.

8. The method of claim 1,
   wherein the heat treating is performed at 500-750° C.

* * * * *

UNITED STATES PATENT AND TRADEMARK OFFICE
CERTIFICATE OF CORRECTION

| | | |
|---|---|---|
| PATENT NO. | : 12,438,154 B2 | Page 1 of 1 |
| APPLICATION NO. | : 18/377439 | |
| DATED | : October 7, 2025 | |
| INVENTOR(S) | : Won Tae Kim et al. | |

It is certified that error appears in the above-identified patent and that said Letters Patent is hereby corrected as shown below:

On the Title Page

Please insert Item (30):
--Foreign Application Priority Data
February 23, 2018 KR 10-2018-0022084--.

Signed and Sealed this
Eleventh Day of November, 2025

John A. Squires
*Director of the United States Patent and Trademark Office*